United States Patent
Fukushi

[11] Patent Number: 5,742,636
[45] Date of Patent: Apr. 21, 1998

[54] SPREAD SPECTRUM RECEIVING APPARATUS WITH BATTERY SAVING FUNCTION

[75] Inventor: Mikio Fukushi, Tokyo, Japan

[73] Assignee: NEC Corporation, Tokyo, Japan

[21] Appl. No.: 570,691

[22] Filed: Dec. 11, 1995

[30] Foreign Application Priority Data

Dec. 9, 1994 [JP] Japan .................................... 6-306414

[51] Int. Cl.⁶ .................................................. H04B 15/00
[52] U.S. Cl. ......................... 375/200; 375/206; 370/311; 455/343
[58] Field of Search ...................... 375/200, 206, 375/208, 209, 210, 236; 370/311, 320, 335, 342; 455/38.3, 343, 574, 229

[56] References Cited

U.S. PATENT DOCUMENTS

| | | | |
|---|---|---|---|
| 4,419,765 | 12/1983 | Wycoff et al. | 455/36 |
| 5,101,417 | 3/1992 | Richley et al. | 375/206 |
| 5,507,039 | 4/1996 | Honma | 455/343 |
| 5,507,040 | 4/1996 | Eaton et al. | 455/343 |
| 5,563,914 | 10/1996 | Sogabe | 375/326 |

FOREIGN PATENT DOCUMENTS

| | | |
|---|---|---|
| A-56-165425 | 12/1981 | Japan . |
| A-57-196637 | 12/1982 | Japan . |
| A-63-52547 | 3/1988 | Japan . |
| A-1-190054 | 7/1989 | Japan . |
| A-1-280931 | 11/1989 | Japan . |
| A-1-314039 | 12/1989 | Japan . |
| A-2-193416 | 7/1990 | Japan . |
| A-2-261226 | 10/1990 | Japan . |

*Primary Examiner*—Wellington Chin
*Assistant Examiner*—Conguan Tran
*Attorney, Agent, or Firm*—Sughrue, Mion, Zinn, Macpeak & Seas, PLLC

[57] ABSTRACT

In a receiving apparatus for spread spectrum communication including a plurality of correlator elements for calculating correlation values between a plurality of bits of a spread spectrum signal and a spread reference code, all the correlator elements are operated in a signal reception mode, and only a portion of the correlator elements are operated in a standby mode.

9 Claims, 6 Drawing Sheets

5,742,636

SPREAD SPECTRUM RECEIVING APPARATUS WITH BATTERY SAVING FUNCTION

BACKGROUND OF THE INVENTION

1. Field of the Invention

The present invention relates to a receiving apparatus for spread spectrum communication, and more particularly, to a spread spectrum receiving apparatus with a battery saving function used in mobile communication.

2. Description of the Related Art

In a spread spectrum communication system, a data signal is multiplied by a spread reference code, i.e., a unique pseudorandom noise (PN) code to spread the data signal. Then, the spread data signal is transmitted. On the other hand, in a spread spectrum receiving apparatus, a received signal is multiplied by the same spread reference code to demodulate the received signal. Since noise superposed onto the received signal in a propagation path is spread by the demodulation, the spread spectrum communication system is characterized by its privacy and interference tolerance, and therefore, has been developed for mobile phones, radio local area networks (LANs), and the like.

In a prior art Spread spectrum receiving apparatus including a plurality of correlator elements for calculating correlation values between a plurality of bits of a spread spectrum signal and a spread reference code, all the correlator elements are operated even in a standby mode where a carrier is not found in a received signal. Generally, in this case, since the correlator elements include a large number of registers (usually, D-type flip-flops), the registers in operation dissipate a large amount of power. Also, a data demodulator is operated in a standby mode which further increases the power dissipation. This will be explained later in detail.

SUMMARY OF THE INVENTION

It is an object of the present invention to reduce the power dissipation of a spread spectrum receiving apparatus.

According to the present invention, in a receiving apparatus for spread spectrum communication, including a plurality of correlator elements for calculating correlation values between a plurality of bits of a spread spectrum signal and a spread reference code, all the correlator elements are operated in a signal reception mode, and only a portion of the correlator elements are operated in a standby mode. Also, a data demodulator is operated in a signal reception mode, while the data demodulator is not operated in a standby mode.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENTS

Figure 1:
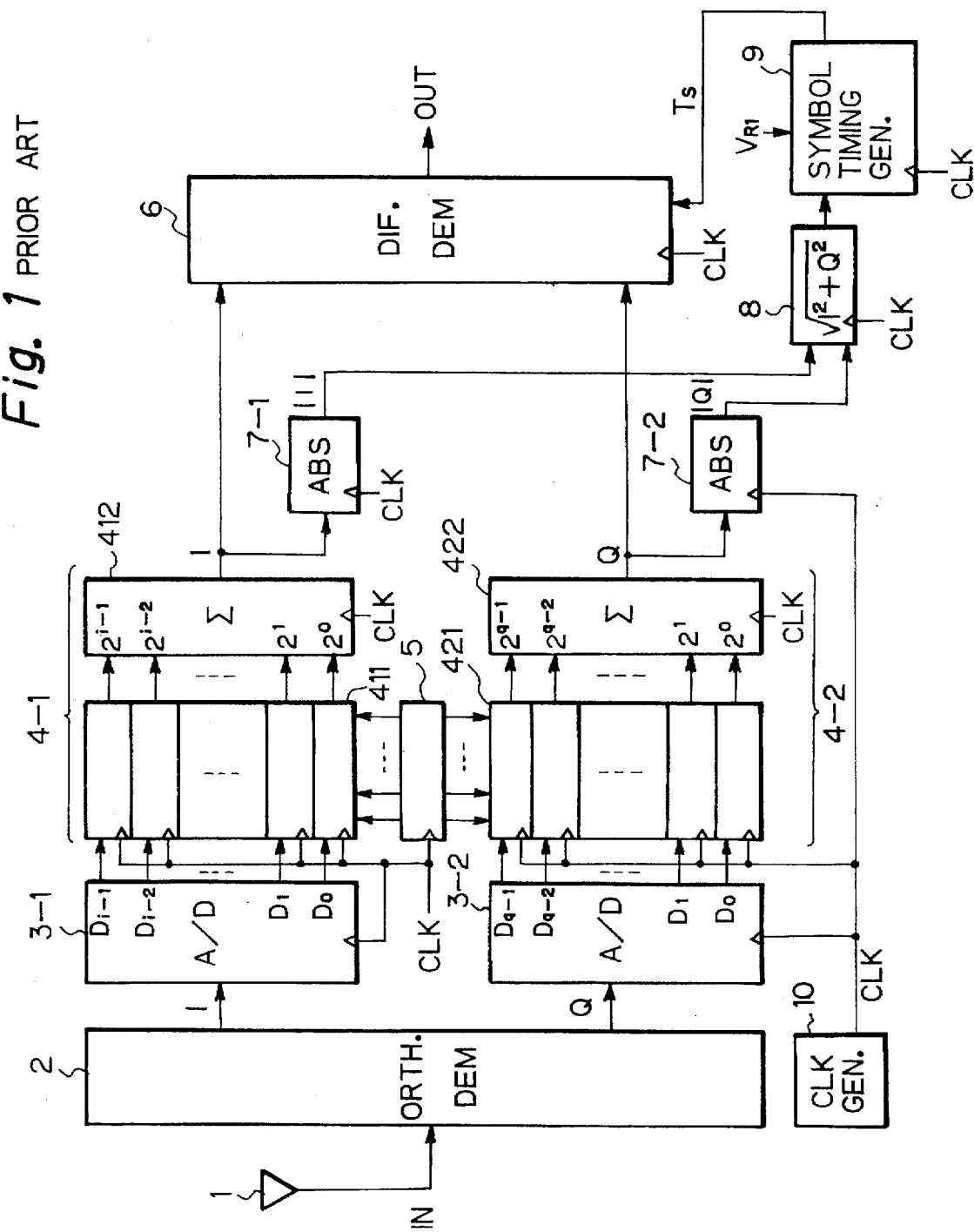
FIG. 1 is a block circuit diagram illustrating a prior art spread spectrum receiving apparatus.

Before the description of the preferred embodiments, a prior art spread spectrum receiving apparatus will be explained with reference to FIGS. 1 and In FIG. 1, reference numeral 2 designates an quadrature demodulator which demodulates a spread spectrum quadrature modulated signal IN from an antenna 1 to generate an in-phase component (I-channel) signal and a quadrature component (Q-channel) signal. An analog/digital (A/D) converter 3-1 performs an A/D conversion upon the I-channel signal to generate an i-bit digital signal. Similarly, an A/D converter 3-2 performs an A/D conversion upon the Q-channel signal to generate a q-bit digital signal.

The i-bat digital signal is supplied to a correlator circuit 4-1 formed by correlator elements 411 and a summing circuit 412. Each of the correlator elements 411 calculates a correlation between one bit of the i-bit digital signal and a spread reference code signal generated from a spread reference code generating circuit 5. The correlations are summed by the summing circuit 412 to generate an I data.

Similarly, the q-bit digital signal is supplied to a correlator circuit 4-2 formed by correlator elements 421 and a summing circuit 422. Each of the correlator elements 421 calculates a correlation between one bit of the q-bit digital signal and the spread reference code signal generated from the spread reference code generating circuit 5. The correlations are summed by the summing circuit 422 to generate a Q data.

The I data and the Q data are supplied to a differential demodulator or a data demodulator 6 which demodulates the I data and the Q data and generates a data signal OUT in response to a symbol timing signal Ts which is generated at every period of the spread reference code signal.

The symbol timing signal Ts is generated by absolute value calculating circuits 7-1 and 7-2, an amplitude calculating circuit 8, and a symbol timing generating circuit 9. That is, the absolute value calculating circuit 7-1 calculates an absolute value of the I data, and the absolute value calculating circuit 7-2 calculates an absolute value of the Q data. Then, the amplitude calculating circuit 8 calculates:

$$\sqrt{I^2 + Q^2}$$

Then, the symbol timing generating circuit 9 selects a maximum value MAX of amplitudes over a symbol time period, and determines whether or not MAX>$V_{R1}$(definite value)

As a result, only when MAX>$V_{R1}$ does the symbol timing generating circuit 9 generate the symbol timing signal Ts whose time period is called a symbol time period.

The elements 3-1, 3-2, 4-1, 4-2, 5, 6, 7-1, 7-2, and 6 and 9 are clocked by a clock signal CLK from a clock signal generating circuit 10. The time period of the clock signal CLK is called a chip time period remarkably smaller than the symbol time period.

Figure 2:
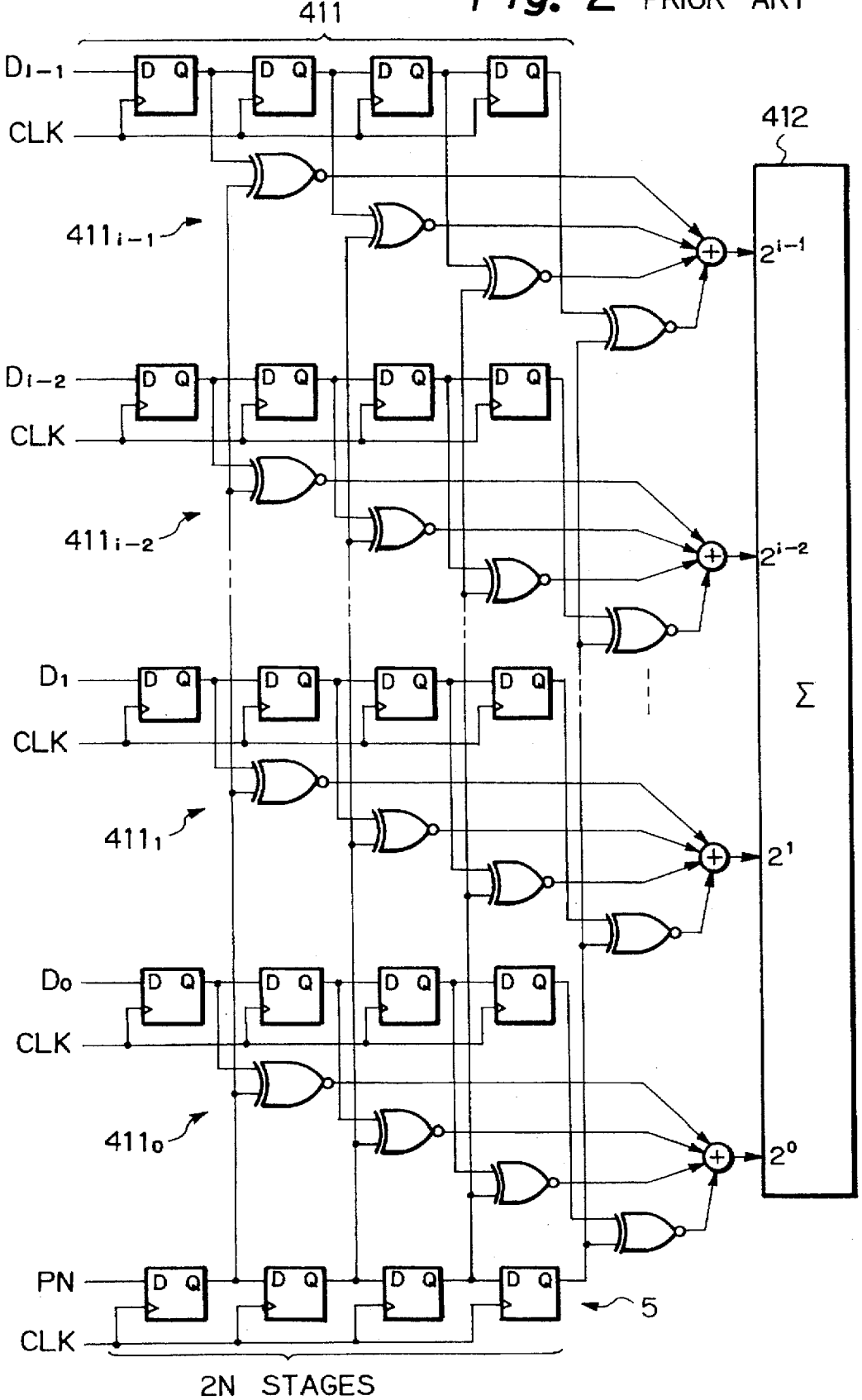
FIG. 2 is a circuit diagram of the correlator circuit and the spread reference code generating circuit of FIG. 1.

In FIG. 2, which is a detailed circuit diagram of the correlator elements 411 ($411_0$, $411_1$, $411_{i-2}$, and $411_{i-1}$), the summing circuit 412 and the spread reference code generating circuit 5 of FIG. 1, if the outputs $D_0$, $D_1, D_{i-2}$ and $D_{i-1}$ of the A/D converter 3-1 are sampled by twice oversampling processing, and the number of bits of the spread reference code signal is N, each of the correlator elements $411_0$, $411_1$, $411_{i-2}$, and $411_{i-1}$), is formed by 2N-stage D-type flip-flops, 2N-stage exclusive NOR circuits, and an adder. Here, one symbol time period is 2N times the chip time period. Note that PN designates a unique pseudorandom noise code.

The correlator elements 421 have a similar configuration to the correlator elements 411.

Therefore, the greater the number of bits of the outputs of the A/D converters 3-1 and 3-2, the greater the power dissipation. Also, the greater the number of bits of the spread reference code signal, the greater the power dissipation.

Also, returning to FIG. 1, since the data demodulator 6 is clocked even in a standby mode where a carrier is not found, the power dissipation is also increased.

Figure 3:
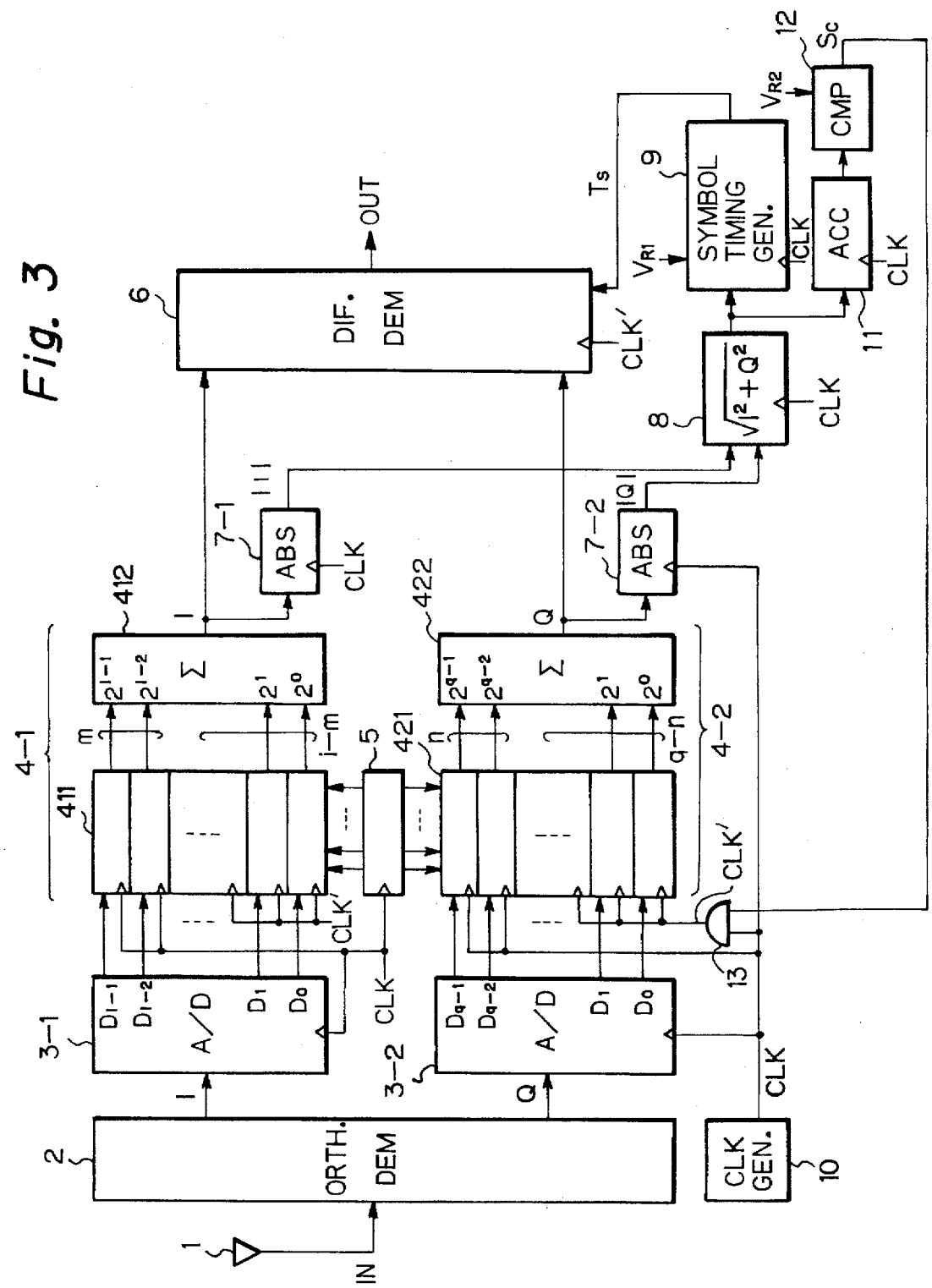
FIG. 3 is a block circuit diagram illustrating an embodiment of the spread spectrum receiving apparatus according to the present invention.

In FIG. 3, which illustrates an embodiment of the present invention, an accumulator 11, a comparator 12, and art AND circuit 13 are added to the elements of FIG. 1. The accumulator 11 accumulates the amplitude value of the amplitude value calculating circuit 8 over a symbol time period, and the comparator 12 compares an accumulated value of the accumulator 11 with a definite value VR2. That is, the accumulator 11 and the comparator 12 serve as a carrier detecting means.

Figure 4:
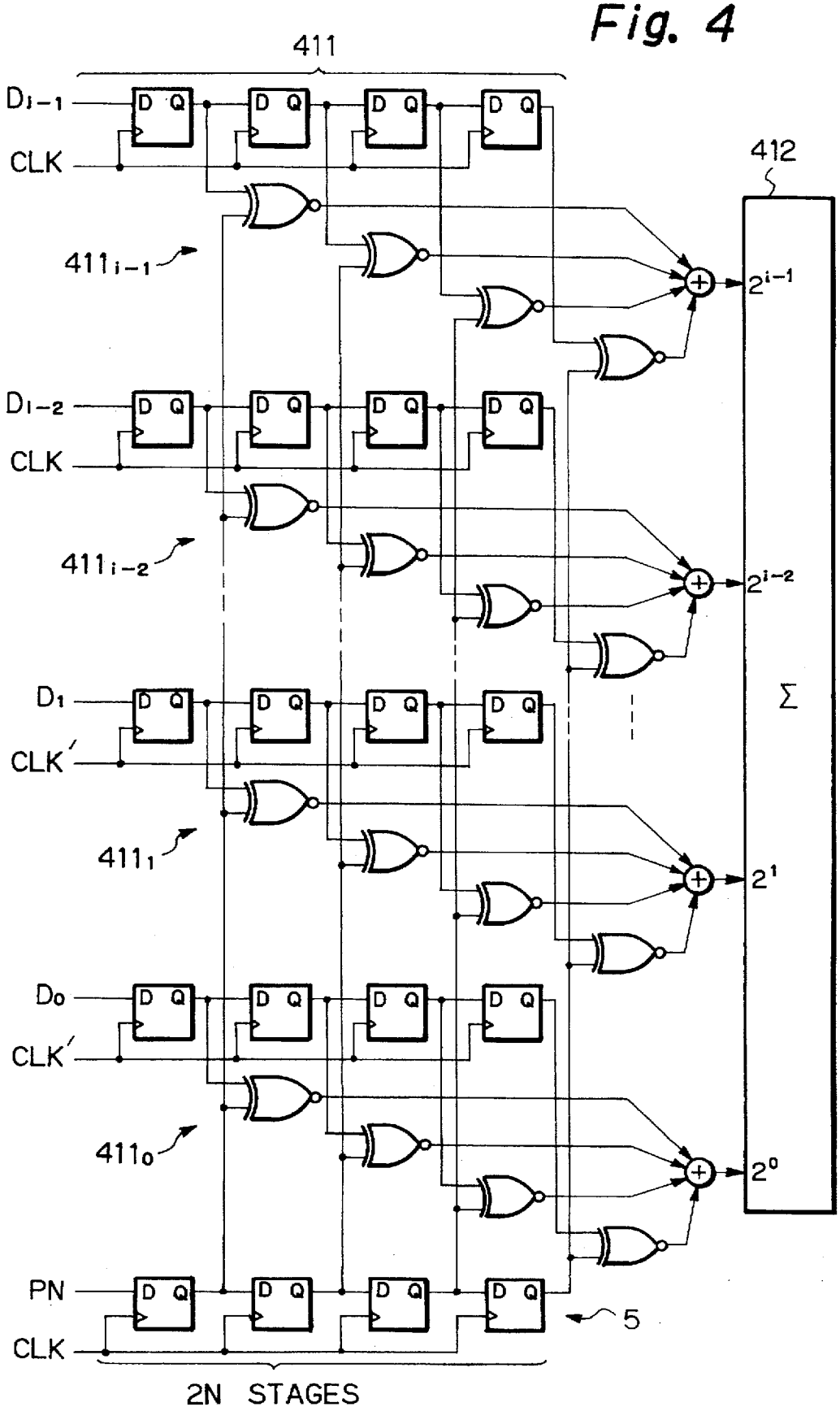
FIG. 4 is a circuit diagram of the correlator circuit of FIG. 3.

In FIG. 3, m of the correlator elements 411 and n of the correlator elements 421 are clocked by the clock signal CLK, while the other (i-m) of the correlator elements 411 and the other (q-n) of the correlator elements 421 are clocked by a clock signal CLK' generated from the AND circuit 13. In more detail, as illustrated in FIG. 4, which is a detailed circuit diagram of the correlator elements 411 ($411_0$, $411_1$, $411_{i-1}$, and $411_{i-2}$), the D-type flip-flops of the correlator elements $411_{i-1}$, $411_{i-2}$, are clocked by the clock signal CLK, while the D-type flop-flops of the correlator elements $411_0$, $411_1$, are clocked by the clock signal CLK'.

Here, the numbers m and n are determined so that it is possible to detect a carrier by the carrier detecting means formed by the accumulator 11 and the comparator 12 For example, m=i/2 and n=q/2.

In a standby mode where the output signal Sc of the comparator 12 is low, the AND circuit 13 is inactive, so that a portion of the correlator elements 411 and a portion of the correlator elements 421 are operated. In this standby state, when a carrier is detected so that the accumulated value is larger than the definite value $V_{R2}$, the AND circuit 13 passes the clock signal CLK therethrough as a clock signal CLK'. As a result, the AND circuit 13 is made active, so that all the correlator elements 411 and 421 are operated. In such a signal reception state, since all the output bits of the A/D converters 3-1 and 3-2 are processed by the correlator elements 411 and 421, the quantization error of the correlator circuits 4-1 and 4-2 is made small.

On the other hand, the differential demodulator 6 is also clocked by the clock signal CLK'. Therefore, in a standby mode, the differential demodulator 6 is not operated, while in a signal reception mode, the differential demodulator 6 is operated.

Figure 5:
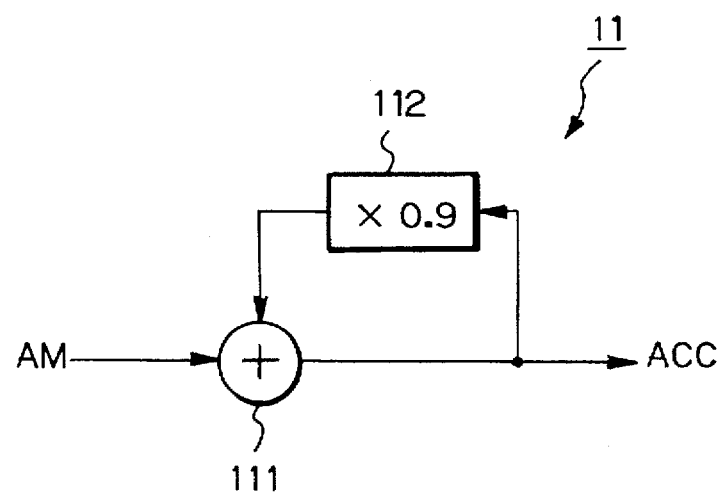
FIG. 5 is a circuit diagram of the accumulator circuit of FIG. 3.

In FIG. 5, which is a detailed circuit diagram of the accumulator 11 of FIG. 3, a leakage value such as 0.1×ACC (ACC: accumulated value) is subtracted from the accumulated value ACC, i.e., 0.9×ACC is calculated,.and an amplitude value AM is added thereto, to prevent the accumulated value ACC from overflowing. For this purpose, art adder 111 and a multiplier 112 with a delay time of the symbol time period $T_S$ are provided.

Figure 6:
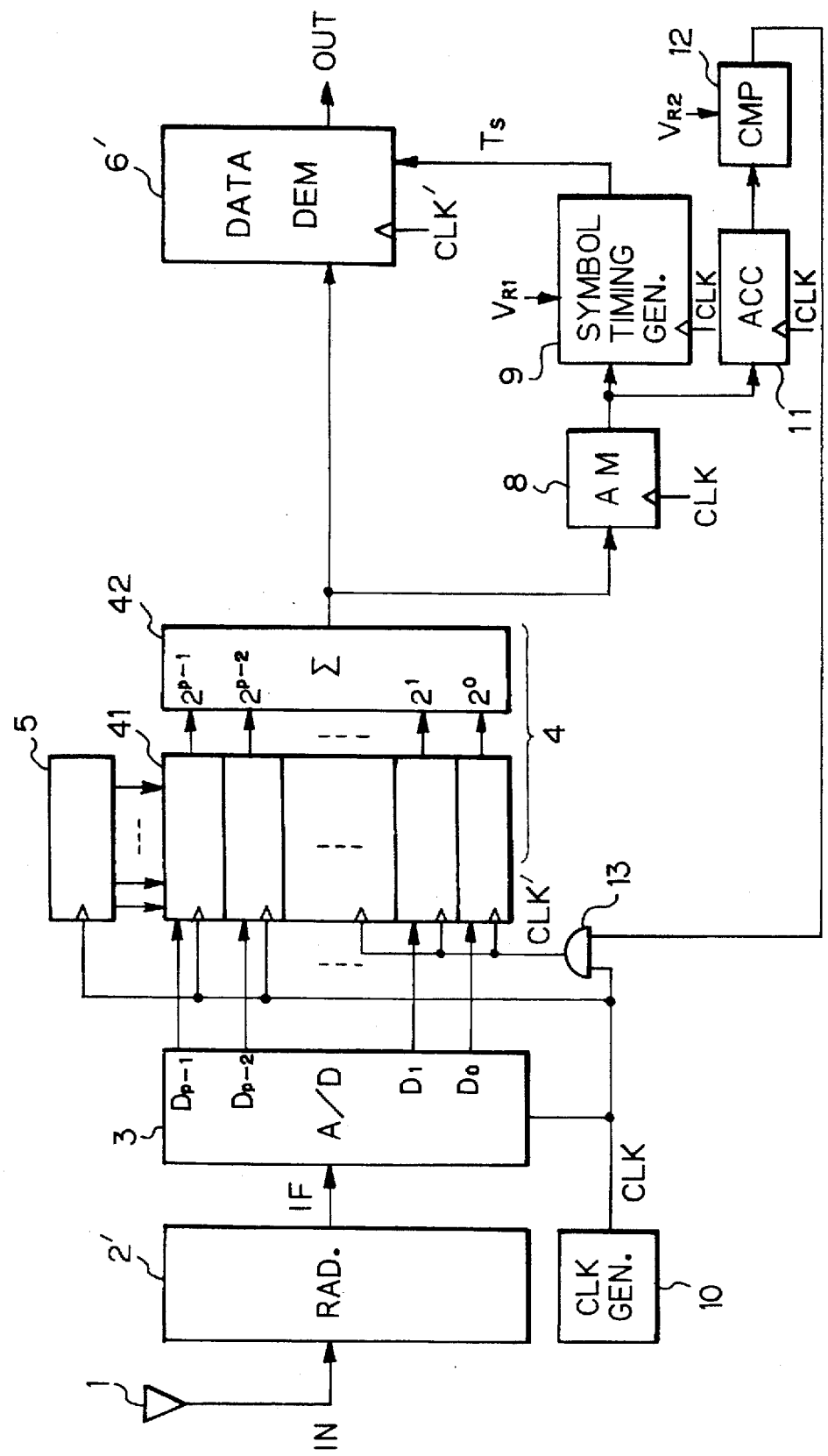
FIG. 6 is a block circuit diagram illustrating another embodiment of the spread spectrum receiving apparatus according to the present invention.

In FIG. 6, which illustrates another embodiment of the present invention, a spread spectrum non-orthogonally modulated signal IN is received by the antenna 1, and an intermediate frequency (IF) component is extracted by a radio portion 2' from the signal IN. An A/D converter 3 performs an A/D conversion upon the IF signal to generate a p-bit digital signal.

The p-bit digital signal is supplied to a correlator circuit 4 formed by correlator elements 41 and a summing circuit 42. Each of the correlator elements 41 calculates a correlation between one bit of the p-bit digital signal and a spread reference code signal Generated from a spread reference code generating circuit 5. The correlations are summed by the summing circuit 42 to generate a correlation data C.

The correlation data C is supplied to a data demodulator 6' which demodulates the correlation data C and generates a data signal OUT in response to a symbol timing signal Ts.

The symbol timing signal Ts is generated by an amplitude calculating circuit 8, and a symbol timing generating circuit 9. That is, the amplitude calculating circuit 8 calculates:

$$|C|$$

Then, the symbol timing generating circuit 9 selects a maximum value of amplitudes over a symbol time period, and determines whether or not MAX>$V_{R1}$(definite value)

As a result, only when MAX>$V_{R1}$, does the symbol timing generating circuit 9 generate the symbol timing signal Ts whose time period is called a symbol time period.

Also, an accumulator 11 accumulates the amplitude value of the amplitude value calculating circuit 8 over a symbol time period, and the comparator 12 compares an accumulated value of the accumulator 11 with a definite value $V_{R2}$. That is, also in this case, the accumulator 11 and the comparator 12 serve as a carrier detecting means.

In FIG. 6, in a standby mode where the output signal Sc of the comparator 12 is low, an AND circuit 13 is inactive, so that a portion of the correlator elements 41 are operated. In this standby state, when a carrier is detected so that the accumulated value is larger than the definite value $V_{R2}$, the AND circuit 13 passes a clock signal CLK of a clock signal generating circuit 10 therethrough as a clock signal CLK'. As a result, the AND circuit 13 is made active, so that all the correlator elements 41 are operated. In such a signal reception 35 state, since all the output bits of the A/D converter 3 are processed by the correlator elements 41, the quantization error of the correlator circuit is made small.

On the other hand, the data demodulator 6' is also clocked by the clock signal CLK'. Therefore, in a standby mode, the data demodulator 6' is not operated, while in a signal reception mode, the data demodulator 6' is operated.

As explained hereinbefore, according to the present invention, since only a portion of the correlator elements are operated in a standby mode, the power dissipation can be reduced.

I claim:

1. A receiving apparatus for spread spectrum communication comprising:

means for receiving a spread spectrum modulated signal to generate a plurality of bit signals;

a plurality of correlator elements each for calculating a correlation value between one of said bit signals and a spread reference code;

means for summing said correlation values to generate a sum signal;

means for detecting a carrier in said spread spectrum modulated signal in accordance with said sum signal;

means for operating all said correlator elements when said carrier is detected in said spread spectrum modulated signal; and means for operating a portion of said correlator elements when said carrier is not found in said spread spectrum modulated signal.

2. An apparatus as set forth in claim 1, wherein spread spectrum modulated signal receiving means comprises:

a filter means for extracting an IF component from said spread spectrum modulated signal; and an A/D converter, connected to said filter means, for performing an A/D conversion upon said IF signal to generate said plurality of bit signals.

3. An apparatus as set forth in claim 1, wherein said carrier detecting means comprises:

means for accumulating an absolute value over a first time period; and means for determining whether or not an accumulated value of said accumulating means is larger than a first definite value, thus detecting said carrier when said accumulated value is larger than said first definite value.

4. An apparatus as set forth in claim 3, wherein said accumulating means comprises:

means for subtracting a leakage value smaller than said accumulated value from said accumulated value at every second time period smaller than said first time period; and means for adding said absolute value to said accumulated value when first time period passes after said leakage value is subtracted from said accumulated value.

5. An apparatus as set forth in claim 1, further comprising:

means for calculating an absolute value of said sum signal;

means for detecting a symbol timing when said absolute value is larger than a second definite value; and means for demodulating said sum signal into data when said symbol timing is detected, said demodulating means being operated only when said carrier is found in said spread spectrum modulated signal.

6. A receiving apparatus for spread spectrum communication comprising:

a quadrature demodulator for demodulating a spread spectrum orthogonally modulated signal to generate an I-channel signal and a Q-channel signal;

a first A/D converter, connected to said quadrature demodulator, for performing an A/D conversion upon said I-channel signal to generate an i-bit digital I-channel signal;

a second A/D converter, connected to said quadrature demodulator, for performing an A/D conversion upon said Q-channel signal to generate a q-bit digital Q-channel signal;

a plurality of first correlator elements, connected to said first A/D converter, for calculating first correlation values between said i-bit digital I-channel signal and a spread reference code signal;

a first summing means for summing said first correlation values;

a plurality of second correlator elements, connected to said second A/D converter, for calculating second correlation values between said q-bit digital Q-channel signal and said spread reference code signal;

a second summing means, for summing said second correlation values;

an amplitude calculating means, for calculating an amplitude value defined by summed values of said first and second summing means;

an accumulating means for accumulating said amplitude value over a first time period;

a determining means for determining whether an accumulated value of said accumulating means is larger than a first definite value;

a first operating means for operating all said first and second correlator elements when said accumulated value is larger than said first definite value; and a second operating means for operating a portion of said first and second corrector elements when said accumulated value is not larger than said first definite value.

7. An apparatus as set forth in claim 6, wherein said accumulating means comprises:

means for subtracting a leakage value smaller than said accumulated value from said accumulated value at every second time period smaller than said first tame period; and means for adding said amplitude value to said accumulated value when said first time period passes after said leakage value is subtracted from said accumulated value.

8. An apparatus as set forth in claim 6, further comprising a data demodulating means for demodulating said summed values to generate data, said data demodulating means being operated only when said accumulated value is larger than said first definite value.

9. An apparatus as set forth in claim 8, further comprising:

means for determining whether or not said amplitude value is larger than a second definite value said data demodulating means being operated in response to a timing when said amplitude value is larger than said second definite value.

* * * * *

UNITED STATES PATENT AND TRADEMARK OFFICE
CERTIFICATE OF CORRECTION

PATENT NO. : 5,742,636
DATED : April 21, 1998
INVENTOR(S) : Fukushi

It is certified that error(s) appears in the above-identified patent and that said Letters Patent is hereby corrected as shown below:

Column 2, line 9, after "and" insert --2--;

line 60, delete "and 6" and insert --and 8--.

Signed and Sealed this

Thirteenth Day of October 1998

Attest:

BRUCE LEHMAN

*Attesting Officer*      *Commissioner of Patents and Trademarks*